United States Patent
Kondo et al.

[11] Patent Number: 5,851,251
[45] Date of Patent: Dec. 22, 1998

[54] MANUFACTURING METHODS OF OPTICAL DISC AND BLANK MASTER

[75] Inventors: Tetsuya Kondo, Yokohama; Takeyoshi Suetsuna, Fujisawa, both of Japan

[73] Assignee: Victor Company of Japan, Ltd., Yokohama, Japan

[21] Appl. No.: 787,770

[22] Filed: Jan. 28, 1997

[30] Foreign Application Priority Data

May 17, 1996 [JP] Japan .................................. 8-148325

[51] Int. Cl.[6] .................................................. C03C 19/00
[52] U.S. Cl. ............................ 65/23; 65/60.2; 65/61; 427/145; 427/165; 427/166
[58] Field of Search .............. 65/23, 60.1, 60.2, 65/60.3, 61; 427/145, 160, 164, 165, 166, 168, 169; 264/2.5; 430/306, 321, 324

[56] References Cited

U.S. PATENT DOCUMENTS

| | | | |
|---|---|---|---|
| 4,482,511 | 11/1984 | Komatsubara | 264/22 |
| 4,619,804 | 10/1986 | Leonard et al. | 264/220 |
| 4,655,876 | 4/1987 | Kawai et al. | 156/643 |
| 4,726,006 | 2/1988 | Benne et al. | 369/280 |
| 5,096,563 | 3/1992 | Yoshizawa et al. | 205/68 |
| 5,346,654 | 9/1994 | Kodaka et al. | 264/1.33 |
| 5,494,782 | 2/1996 | Maenza et al. | 430/321 |
| 5,503,963 | 4/1996 | Bifano | 430/321 |

OTHER PUBLICATIONS

AR—Plastics Technology, pp. 73–82 "Super–Precision Disc Molding . . . ", Carl Kirkland, Apr. 1985.

Primary Examiner—Stanley S. Silverman
Assistant Examiner—Sean Vincent
Attorney, Agent, or Firm—Michael N. Meller

[57] ABSTRACT

A blank master for manufacturing an optical disc is produced by the method including steps of grinding a glass disc, cleansing the glass disc, drying the glass disc, coating a binding agent on the glass disc, coating a photo resist on the glass disc within 24 hours from the grinding, and baking the glass disc.

2 Claims, 2 Drawing Sheets ic # MANUFACTURING METHODS OF OPTICAL DISC AND BLANK MASTER

BACKGROUND OF THE INVENTION

1. Field of the Invention

The present invention relates to an optical disc, a blank master for optical disc, and manufacturing method of the optical disc and the blank master, especially relates to a high density recording/reproducing optical disc.

2. Description of the Related Art

Recently, there has been growing use of optical discs, on which information are read by a laser beam. Presently, optical discs such as a CD (Compact Disc) and a CD-ROM (Read Only Memory), are widely used. The CD-ROM is used not only for a computer but also for a multifunctional game machine. A storage device for a computer or a game machine is changing to an optical disc from a ROM cartridge or a magnetic disc such as a floppy disc. A digital video disc (DVD) is now on sale, and will be used as a storage device for recording movies and other multimedia programs in the near future.

As shown in the above, there used many optical discs now. Each optical discs is manufactured in the same manner, and in general, the manufacturing process is begun by making a stamper having information pits or grooves.

A manufacturing process of a stamper of a prior art will be explained referring to FIGS. 1(A) through 1(E).

A photoresist film 21 of positive or negative type is coated uniformly by a spin coat technology on a glass disc 20 having a precisely ground flat surface, coated by a layer (not shown) which gives the photoresist film 21 strong adhesion to the glass disc 20. Then the glass disc 20 is heated by a heating unit such as a hot plate. The glass disc 20 after undergone the above process is called a blank master (shown in FIG. 1(A)). The photoresist film 21 is exposed to a laser beam 22 modulated by a signal to be recorded, and collected by a lens 23 (shown in FIG. 1(B)). An exposed photoresist film 24 forms a pit in the case of ROM type optical disc, such as CD, LD (laser disc), CD-ROM, and DVD, and forms a groove in the case of recording/reproducing type optical disc, such as a phase change optical disc, a magneto-optical disc, and a direct read after write optical disc. The photoresist film 21, in case of a positive photo resist, is developed by utilizing an alkaline liquid, such as a solution of sodium hydrogenphosphate, and the exposed portions 24 of the photoresist film 21 is dissolved. Thus, a pit or a groove pattern of the photoresist film 21 is formed (shown in FIG. 1(C)).

An electrically conductive film (not shown), such as nickel, is deposited on the pattern of photoresist film 21 by utilizing depositing technology, such as sputtering. A nickel film 25 of predetermined thickness is plated on the photoresist film 21 utilizing the electrically conductive film as an electrode. (shown in FIG. 1(D)). Then, the nickel film 25 is separated from the glass disc 20, and the residual photoresist film 21 is removed. As shown in FIG. 1(E), a negative pattern of the photoresist film 21 is transcribed to the nickel film 25, thus, a stamper is prepared.

An optical disc is manufactured utilizing the stamper through processes of injection mold, reflective film depositing, and protective film depositing. When necessary, the optical disc is adhered to another, or some marks and/or characters are printed on the surface.

A jitter of a reproduced signal is one of measures for evaluating a quality of a recorded signal on the optical disc. The jitter is a drift of the reproduced signal, caused by a defect of the recorded signal. The small jitter means a high quality optical disc. An optical disc having a small jitter is stable in operation even when the optical disc is inclined to the laser beam, or warped by high temperature or high humidity. As for an optical disc having a large jitter, the larger the change of the ambient condition becomes, the larger the jitter becomes, and it becomes more difficult for an optical pick up to detect a signal on the optical disc. In this case, sometimes a block error rate of the reproduced signal increases, and in the extreme case, it becomes impossible to reproduce the optical disc. The DVD system requires the jitter of the optical disc being smaller than 8%. Here, the jitter is defined by a time axis drift of a waveform equalized signal referred to a channel bit clock rate.

The jitter of an optical disc is relied on a quality of a stamper utilized for manufacturing the optical disc. In the prior art, there can be manufactured many levels of qualities of stampers, because the stamper manufacturing process is not controlled adequately. This is not desirable for the quality control of the optical disc, and results that optical discs having a large jitter are sold in the market, which cannot reproduce signals in some environmental conditions.

In the developing process of the photoresist film 21 of the prior art, the non-exposed portion of the photoresist film 21 sometimes peels off. This means a lack of a pit or a groove, and a signal, and leads to a faulty product.

As explained in the above, there are two problems to be improved in the optical disc manufacturing process of the prior art, the jitter of an optical disc and the developing process of the photoresist.

SUMMARY OF THE INVENTION

Accordingly, a general object of the present invention is to provide a novel and useful manufacturing method of an optical disc by improving a jitter of an optical disc and a developing process of the photoresist for manufacturing a stamper.

A specific object of the present invention is to provide a manufacturing process of a blank master by setting an interval between a grinding process of a glass disc and a coating process of a photoresist within 24 hours.

DETAILED DESCRIPTION OF THE PREFERRED EMBODIMENTS

Figure 1A:
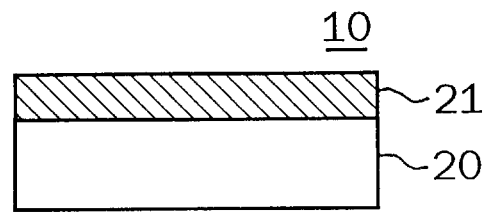
FIG. 1(A) shows a blank master of the present invention.

An optical disc and a manufacturing process of an optical disc according to the present invention will be described in detail with reference to the accompanying drawings, in which same reference numerals and symbols are used to denote like or equivalent elements used in the aforementioned prior arts, and detailed explanation of such elements are omitted for simplicity.

It is revealed that the quality of a blank master relates strongly to improvements of the jitter and the developing process of the photoresist.

It is also revealed that the quality of the blank master relates to the time interval between the grinding process of the glass disc and the coating process of the photoresist, and the interval should be within a day.

It is further revealed that chemical activity of the glass disc is the strongest just after grinding, and becomes weaker as time passes. Therefore, if the photoresist is coated on the glass disc long after the grinding, the photoresist will behave poor adhesion to the glass disc. The poor adhesion of the photo resist will cause peeling off of the photoresist in the developing process, and will exhibit a poor developed pattern which will cause a jitter of a reproduced signal.

A manufacturing method of blank master of an optical disc of the present invention will be explained referring to FIGS. 1(A) through 1(E) and FIG. 2.

FIG. 1(A) shows a blank master of the present invention.

Figure 1B:
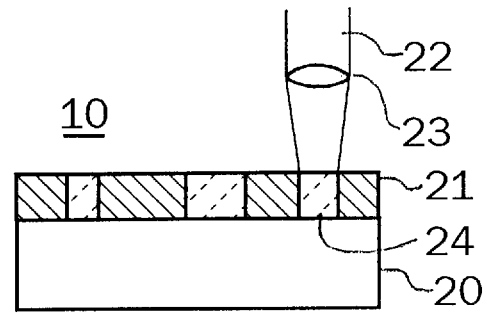
FIG. 1(B) shows an exposing process of the present invention.

FIG. 1(B) shows an exposing process of the present invention.

Figure 1C:
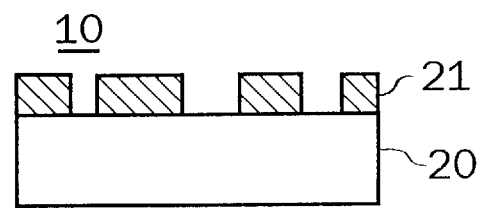
FIG. 1(C) shows a developing process of the present invention.

FIG. 1(C) shows a developing process of the present invention.

Figure 1D:
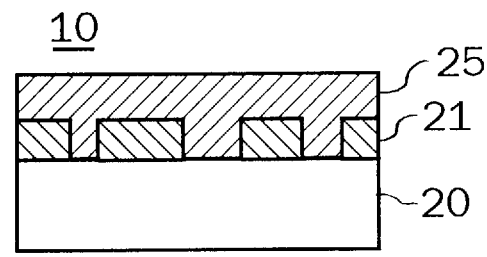
FIG. 1(D) shows a plating process of the present invention.

FIG. 1(D) shows a plating process of the present invention.

Figure 1E:
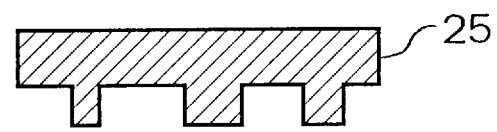
FIG. 1(E) shows a stamper of the present invention.

FIG. 1(E) shows a stamper of the present invention.

Figure 2:
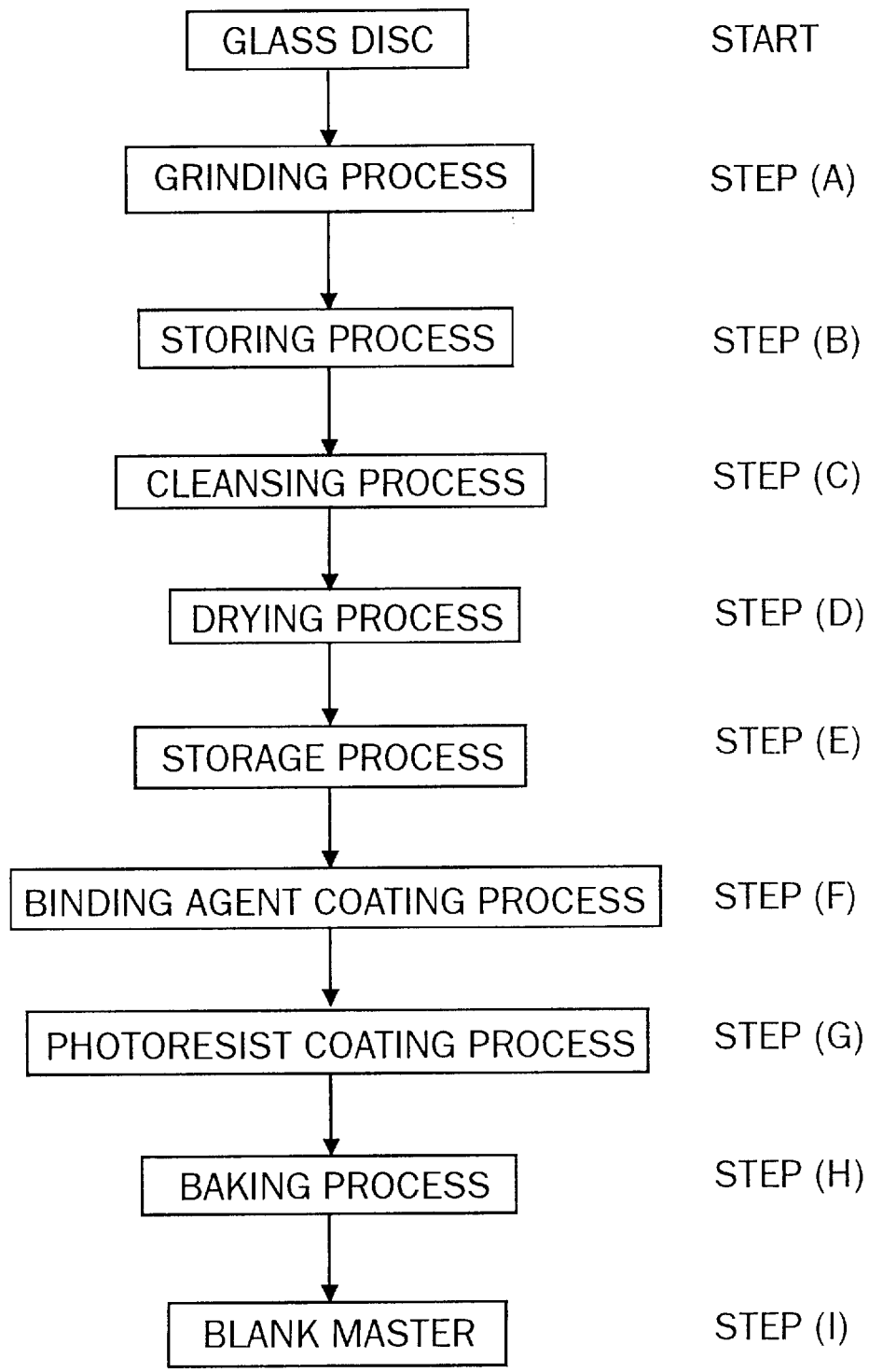
FIG. 2 shows a block diagram of a manufacturing process of a blank master of the present invention.

FIG. 2 shows a block diagram of a manufacturing process of a blank master of the present invention.

[1st Embodiment]

A blank master 10 is manufactured following to a manufacturing process shown in FIG. 2.

A glass disc is ground precisely by utilizing cerium oxide (step A). The ground glass disc is temporarily stored in isopropyl alcohol (step B). (Storage time: t1=0.1 hour) The ground glass disc is cleansed with a brush, and then ultrasonically cleaned in demineralized water (step C). The glass disc is dried by spinning (step D). The glass disc is temporarily stored in clean air (step E). (Storage time: t2=0.1 hour) The glass disc is kept in saturated atmosphere of hexamethyldisilazane (HMDS) for 3 minutes so as to be coated with the HMDS as a binding agent (step F). The glass disc is coated with a photoresist film 21 of TSMR-V3 (Tokyo Ohka Kogyo Co., Ltd.) thinned in ethylcellosolveacetate (ECA). A thickness of the photoresist is controlled to be 70 nm in a spin coating (step G). At last, the glass disc is baked at 80° C. (step H), and a blank master 10 is thus completed (step I) (FIG. 1(A)).

A latent image of eight to fourteen modulation (EFM) signal, a minimum pit length of 0.254 $\mu$m and a track pitch of 0.6 $\mu$m, is formed on the blank master 10 by utilizing a laser beam 22 (FIG. 1(B)).

A series of pits of an information signal on the blank master is developed by utilizing a solution of 0.2 normal sodium hydrogenphosphate (FIG. 1(C)).

Remaining manufacturing processes are the same of the prior art, and a stamper 25 is produced.

30 pieces of stamper 25 are produced in the same process as the above, and from each of the stampers 25 an optical disc is manufactured as follows. A reflecting layer and a protecting layer usually are provided on the surface of the optical disc in order. The optical disc of 1.2 mm thick is produced by laminating 2 pieces of 0.6 mm injection molded substrate, one of the substrates carries the information signal pits, and another has no signal pit i.e. a mirror surface.

Thus prepared adhered optical discs are evaluated by the following 2 methods.

Evaluation method 1:

Each of the 30 adhered optical discs is evaluated of a jitter of a reproduced equalized signal utilizing a drive system having an optical pickup unit comprising a krypton (Kr) gas laser ($\lambda$=413 nm) and an optical lens of numerical aperture (NA) 0.6. An average of the measured jitter values is calculated and listed in Table 1.

Evaluation method 2:

After the developing process, each of the glass discs after the removal of the exposed photoresist film 24, is examined a presence of peeling of the photoresist film 21 by a visual inspection, and confirmed by utilizing an optical microscope. Numbers of the glass disc having the peeling are listed in Table 1.

Examined results:

The average jitter of the 30 optical discs was 6.0%, and there occurred no peeling in the developing process.

[2nd through 6th Embodiments]

In these embodiments, only the storage times are differently set to, and other conditions and processes are the same to those of the 1st embodiment.

The storage times (t1, t2) are respectively set to (4, 2), (20, 0.1), (0.1, 20), (24, 0.1), (0.1, 24) (hours).

Examined results:

The maximum value of the average jitters was 7.4%. It was revealed that the shorter the sum of the storage times t1 and t2 was, the smaller the average jitter became.

There occurred no peeling in the developing process.

[7th Embodiment]

In this embodiment, the storage time t1 is set to zero, namely, the storage process in isopropyl alcohol is omitted. The storage time t2 is set to 0.1 hours, and other conditions and processes are the same to those of the 1st embodiment.

Examined results:

The average jitter was 6.0%.

There occurred no peeling in the developing process.

[8th Embodiment]

Ethyl lactate acid (EL) is utilized as a thinner of the photoresist film 21, and other conditions and processes are the same to those of the 1st embodiment.

Examined results:

The average jitter was 6.2%.

There occurred no peeling in the developing process.

[9th Embodiment]

Propyleneglycolmonomethyletheracetate (PGMEA) is utilized as a thinner of the photo resist film 21, and other conditions and processes are the same to those of the 1st embodiment.

Examined results:

The average of the jitter was 6.0%.

There occurred no peeling in the developing process.

Comparatives of which storage times are different from the present invention are prepared to be compared to the results of the present invention.

<1st through 7th Comparatives>

The storage times (t1, t2) are respectively set to (28, 0.1), (0.1, 28), (42, 0.1), (0.1, 42), (80, 0.1), (168, 0.1), (360, 0.1) (hours).

Other conditions and processes are the same to those of the 1st embodiment.

Examined results:

The average jitter of the 1st comparative was 7.6%.

The average jitter of the 2nd comparative was 8.0%.

It was revealed that the larger the sum of the storage times t1 and t2 was, the larger the average jitter becomes.

When the sum of the storage times t1 and t2 was not less than 80 hours, there occurred peeling in the developing process.

All results of the above are shown in the table 1 below.

TABLE 1

|  | Thinner *1 | t1 *2 | t2 *3 | Eval. 1 *4 (%) | Eval. 2 *5 |
|---|---|---|---|---|---|
| 1st Emb. | ECA | 0.1 | 0.1 | 6.0 | 0/30 |
| 2nd Emb. | ECA | 4 | 2 | 6.1 | 0/30 |
| 3rd Emb. | ECA | 20 | 0.1 | 6.5 | 0/30 |
| 4th Emb. | ECA | 0.1 | 20 | 7.0 | 0/30 |
| 5th Emb. | ECA | 24 | 0.1 | 7.0 | 0/30 |
| 6th Emb. | ECA | 0.1 | 24 | 7.4 | 0/30 |
| 7th Emb. | ECA | 0 | 0.1 | 6.0 | 0/30 |
| 8th Emb. | EL | 0.1 | 0.1 | 6.2 | 0/30 |
| 9th Emb. | PGMEA | 0.1 | 0.1 | 6.0 | 0/30 |
| 1st Com. | ECA | 28 | 0.1 | 7.6 | 0/30 |
| 2nd Com. | ECA | 0.1 | 28 | 8.0 | 0/30 |
| 3rd Com. | ECA | 42 | 0.1 | 8.3 | 0/30 |
| 4th Com. | ECA | 0.1 | 42 | 8.1 | 0/30 |
| 5th Com. | ECA | 80 | 0.1 | 9.2 | 2/30 |
| 6th Com. | ECA | 168 | 0.1 | 11.6 | 7/30 |
| 7th Com. | ECA | 360 | 0.1 | 19.8 | 12/30 |

*1 thinner of the photo resist film 21;
*2 storage time in isopropyl alcohol;
*3 storage time in clean air;
*4 average of jitter (%);
*5 peeled number of glass discs per 30 discs.

As described in the foregoing, an optical disc manufactured by the method of the present invention has a jitter of smaller than 8.0%, and the stamper manufactured by the method of the present invention has no peeling.

In the present invention, various modification and changes may be made without departing from the scope of the present invention.

The thinner of the photoresist may be changed to another material, such as ethyl pyrurate acid, methyl-3-methoxypropionate, methyl-3-ethoxypropionate, butyl acetate, methylamylketone, and cyclohexanone.

In the manufacturing process of the glass disc, shown in FIG. 2, some of them may be changed to the following;

The glass disc may be temporarily stored in water (step B);

The glass disc may be cleansed utilizing a detergent, and then ultrasonically cleansed in the demineralized water (step C);

The glass disc may be dried by lifting it up after dipping in hot demineralized water (step D);

HMDS may be replaced by another adequate binding agent (step F);

A spin coat process may be applied for coating a binding agent on the glass disc (step F); and A drying process or a heating process may be applied to after the coating process of a binding agent on the glass disc (step F).

The above mentioned manufacturing method of the present invention may be adapted to other types of discs, such as a two-layer disc, a multilayer disc, a recording/reproducing type disc, a partial ROM disc, and a disc of combination of these types.

The manufacturing method of the present invention can provide a stamper having no defects, and an optical disc having a small jitter.

What is claimed is:

1. A manufacturing method of a blank master of an optical disc having a jitter of less than 8% including at least the steps of grinding a glass disc, cleansing the ground disc, drying the cleansed disc, coating a binding agent on the dried disc, coating a photoresist on the binding agent coated disc, and baking the photoresist coated disc, wherein the step of the coating of the photoresist is performed after the step of grinding the glass disc within about 24 hours.

2. A manufacturing method of an optical disc having a jitter of less than 8% manufactured by utilizing a stamper produced by a blank master, in which a manufacturing method of the blank master for obtaining an optical disc having a jitter of less than 8% includes at least the steps of grinding a glass disc, cleansing the ground disc, drying the cleansed disc, coating a binding agent on the dried disc, coating a photoresist on the binding agent coated disc, and baking the photoresist coated disc, wherein the the step of the coating of the photoresist is performed after the step of grinding the glass disc within about 24 hours.

* * * * *